US009598034B2

(12) United States Patent
Kojima (10) Patent No.: US 9,598,034 B2
(45) Date of Patent: Mar. 21, 2017

(54) STRUCTURE FOR JOINING RESIN PARTS AND BUMPER COVER STRUCTURE

(71) Applicant: TOYOTA JIDOSHA KABUSHIKI KAISHA, Toyota-shi, Aichi-ken (JP)

(72) Inventor: Yoshihiro Kojima, Aichi-gun (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 14/759,723

(22) PCT Filed: Nov. 29, 2013

(86) PCT No.: PCT/JP2013/082752
§ 371 (c)(1),
(2) Date: Jul. 8, 2015

(87) PCT Pub. No.: WO2014/122844
PCT Pub. Date: Aug. 14, 2014

(65) Prior Publication Data
US 2015/0353041 A1 Dec. 10, 2015

(30) Foreign Application Priority Data
Feb. 5, 2013 (JP) ................................ 2013-020727

(51) Int. Cl.
*B60R 19/18* (2006.01)
*B29L 31/30* (2006.01)
(Continued)

(52) U.S. Cl.
CPC ............ *B60R 19/18* (2013.01); *F16B 5/0664* (2013.01); *B29C 65/58* (2013.01); *B29C 66/126* (2013.01);
(Continued)

(58) Field of Classification Search
CPC ............ B60R 19/18; B60R 2019/1886; F16B 5/0664; F16B 5/07; F16B 5/0635;
(Continued)

(56) References Cited

U.S. PATENT DOCUMENTS

| 6,948,753 | B2* | 9/2005 | Yoshida | .................. B60R 13/04 296/1.08 |
| 2003/0094835 | A1 | 5/2003 | Yoshida et al. | |
| 2009/0167037 | A1* | 7/2009 | Czopek | .................. B29C 51/10 293/120 |

FOREIGN PATENT DOCUMENTS

| JP | 2001-180400 A | 7/2001 |
| JP | 2003-146147 A | 5/2003 |

(Continued)

*Primary Examiner* — Joseph D Pape
*Assistant Examiner* — Dana Ivey
(74) *Attorney, Agent, or Firm* — Oliff PLC (57) ABSTRACT

One resin part has an engaged portion at an end portion. The engaged portion has a fit-together hole at an inner wall and a first extending piece disposed at a peripheral edge portion of the fit-together hole extends-out from a first side wall that connects the inner wall and the end portion of the one resin part. Another resin part is to be made integral with the one resin part, and the other resin part has an abutment wall and a second extending piece that extends-out from a distal end portion of the abutment wall. The abutment wall abuts the first side wall of the engaged portion, and the second extending piece abuts the first extending piece in a state in which the second extending piece has been inserted in the fit-together hole and the abutment wall is abutted the first side wall.

7 Claims, 11 Drawing Sheets

(51) Int. Cl.
    *B29C 65/58*     (2006.01)
    *B29C 65/00*     (2006.01)
    *F16B 5/06*      (2006.01)
    *F16B 5/07*      (2006.01)

(52) U.S. Cl.
    CPC .. *B29C 66/12425* (2013.01); *B29C 66/12441* (2013.01); *B29C 66/21* (2013.01); *B29C 66/54* (2013.01); *B29L 2031/3005* (2013.01); *B29L 2031/3041* (2013.01); *B29L 2031/3044* (2013.01); *B29L 2031/3055* (2013.01); *B60R 2019/1886* (2013.01); *F16B 5/0635* (2013.01); *F16B 5/07* (2013.01); *Y10T 403/70* (2015.01)

(58) Field of Classification Search
    CPC ........... Y10T 403/70; B29L 2031/3044; B29L 2031/3041; B29L 2031/3005; B29L 2031/3055; B29C 66/21; B29C 66/126; B29C 66/54; B29C 66/12441; B29C 66/12425; B29C 65/58
    USPC ........................................................ 293/155
    See application file for complete search history.

(56) References Cited

FOREIGN PATENT DOCUMENTS

| | | |
|---|---|---|
| JP | 2005-291265 A | 10/2005 |
| JP | 2006-315553 A | 11/2006 |
| JP | 2009-262761 A | 11/2009 |
| JP | 2013-018304 A | 1/2013 |
| WO | 96/08393 A1 | 3/1996 |

\* cited by examiner

STRUCTURE FOR JOINING RESIN PARTS AND BUMPER COVER STRUCTURE

FIELD OF THE INVENTION

The present invention relates to a structure for joining resin parts and to a bumper cover structure.

DESCRIPTION OF THE RELATED ART

In Japanese Patent Application Laid-Open (JP-A) No. 2003-146147, it is disclosed that a second garnish (another resin part) is fit-together with and made integral with a first garnish (one resin part). Concretely, positioning of the second garnish in the vehicle vertical direction of the first garnish is carried out due to engaging projecting portions (engaging portions) that are formed at the second garnish being inserted into engaged portions (fit-together holes) formed in the first garnish and the both parts being fit-together.

However, because the engaging projecting portions are provided at a reverse surface side of a design surface of the second garnish, sink marks arise at the design surface side of the second garnish.

SUMMARY OF THE INVENTION

Technical Subject

In consideration of the above-described circumstances, a subject of the present invention is to provide a structure for joining resin parts and a bumper cover structure that position another resin part with respect to one resin part, and that prevent or suppress the occurrence of sink marks at design surface sides of the one resin part and the other resin part.

Solution Addressing the Subject

In a structure for joining two resin parts of a first aspect of the present invention, one resin part has an engaged portion at an end portion, the engaged portion is bent toward a reverse surface side of the one resin part and is formed in a hook shape. The engaged portion has a fit-together hole provided at an inner wall and a first extending piece that is disposed at a peripheral edge portion of the fit-together hole and extends-out from a first side wall that connects the inner wall and the end portion of the one resin part. Another resin part, that is to be made integral with the one resin part, the other resin part has an abutment wall that is bent toward a reverse surface side of the other resin part at an end portion of the other resin part and a second extending piece that extends-out from a distal end portion of the abutment wall. The abutment wall abuts the first side wall of the engaged portion, and the second extending piece abuts the first extending piece in a state in which the second extending piece has been inserted in the fit-together hole of the engaged portion and the abutment wall is abutted the first side wall.

In the structure for joining two resin parts of the first aspect, one resin part and another resin part are to be made integral. An engaged portion, that is bent toward the reverse surface side of the one resin part (the side opposite the design surface) and is formed in a hook shape, is provided at the end portion of the one resin part. A fit-together hole is provided in an inner wall that structures a portion of the engaged portion. A first extending piece, that is disposed at the peripheral edge portion of the fit-together hole, extends-out from the first side wall that joins the inner wall and the end portion of the one resin part.

The abutment wall, that is bent toward the reverse surface side of the other resin part (the side opposite the design surface), is provided at the end portion of the other resin part. This abutment wall abuts the first side wall of the engaged portion. A second extending piece extends-out from the distal end portion of the abutment wall. In the state in which the second extending piece is inserted in the fit-together hole of the engaged portion and the abutment wall is abutted the first side wall, the second extending piece abuts the first extending piece.

In this way, in the state in which the second extending piece that is provided at the other resin part is inserted in the fit-together hole, the abutment wall of the other resin part shifting downward with the distal end portion of the abutment wall being the starting point, or so-called sagging due to its own weight, can be suppressed due to the second extending piece abutting the first extending piece that is provided at the one resin part. Accordingly, the state in which the abutment wall of the other resin part is made to abut the first side wall of the one resin part is maintained.

Further, the first side wall that structures the engaged portion is formed by being bent toward the reverse surface side at the end portion of the one resin part. The abutment wall is formed by being bent toward the reverse surface side at the end portion of the other resin part. Therefore, the first side wall and the abutment wall can be formed without changing the thickness of the one resin member or the other resin member. Accordingly, at the one resin part and the other resin part, sink marks that arise at the design surface can be prevented or suppressed.

In a structure for joining two resin parts of a second aspect of the present invention, in the structure for joining of the first aspect, the engaged portion has a second side wall that is disposed so as to face the first side wall, and an abutment rib that is formed at the second side wall. The abutment rib abuts the abutment wall of the other resin part in a state in which the abutment wall is abutted the first side wall.

In the structure for joining resin parts of the second aspect, the second side wall, that structures a portion of the engaged portion, is disposed so as to face the first side wall. The abutment rib, that abuts the abutment wall of the other resin part in the state in which the first side wall is made to abut the abutment wall, is formed at the second side wall. Due to this abutment rib, the abutment wall is supported, and the state in which the abutment wall is abutted the first side wall is maintained.

In a structure for joining resin parts of a third aspect of the present invention, in the structure for joining resin parts of the first or second aspect, the engaged portion further has a fitted-together portion that is provided at a peripheral edge portion of the fit-together hole, and the other resin part further has a fit-together piece that extends-out from the distal end portion of the abutment wall. The fit-together piece is inserted into the fit-together hole of the engaged portion, and is provided with a fit-together portion that fits-together with the fitted-together portion of the engaged portion.

In the structure for joining resin parts of the third aspect, the fitted-together portion is provided at the peripheral edge portion of the fit-together hole of the one resin part. Further, a fit-together piece extends-out from the distal end portion of the abutment wall of the other resin part. A fit-together portion is provided at the fit-together piece. The fit-together portion fits-together with the fitted-together portion in the state in which the fit-together piece is inserted in fit-together hole. Due thereto, movement, along a direction of inserting the fit-together piece into the fit-together hole, of the other resin part with respect to the one resin part is restricted.

In a structure for joining resin parts of a fourth aspect of the present invention, in the structure for joining resin parts of the third aspect, the fitted-together portion of the engaged portion is a fit-together claw, and the fit-together portion of the fit-together piece is a hole portion with which the fit-together claw fits-together.

In the structure for joining resin parts of the fourth aspect, the fitted-together portion of the one resin part is a fit-together claw. A hole portion, with which the fit-together claw fits-together, is formed in the fit-together piece of the other resin part. When the fit-together piece is inserted in the fit-together hole, the fit-together claw fits-together with the hole portion. In a case in which the fit-together claw is provided at the fit-together piece of the other resin part for example, when the fit-together piece is inserted in the fit-together hole of the one resin part, the fit-together piece must be inserted in with caution such that the fit-together claw does not contact the design surface of the one resin part. However, in the present invention, there is no such need.

In a structure for joining resin parts of a fifth aspect of the present invention, in the structure for joining resin parts of the third or fourth aspect, an opposing rib is provided at the second side wall of the engaged portion at a position that opposes the second extending piece of the abutment wall that is inserted in the fit-together hole.

In the structure for joining resin parts of the fifth aspect, the opposing rib, that opposes the second extending piece that is inserted in the fit-together hole, is provided at the second side wall at the engaged portion of the one resin part. Due thereto, at the time when the fit-together piece is fit-together with the fitted-together portion, even if, due to the flexural deformation of the fit-together piece, the second extending piece flexes following the flexural deformation of the fit-together piece, the amount of flexing is suppressed because the second extending piece abuts the opposing rib.

In a structure for joining resin parts of a sixth aspect of the present invention, in the structure for joining resin parts of the fifth aspect, the opposing rib is disposed at a position that is offset with respect to the first extending rib, when viewing the engaged portion in plan view.

In the structure for joining resin parts of the sixth aspect, the opposing rib is disposed at a position that is offset with respect to the first extending piece, as seen in plan view. Therefore, at a core mold for forming the upper bumper, the thickness of the core mold can be made to be thick as compared with a case in which the first extending piece and the opposing rib are formed at positions opposing one another.

In a structure for joining resin parts of a seventh aspect of the present invention, in the structure for joining resin parts of any of the third through the sixth aspects, a length of the second extending piece is determined such that the second extending piece is inserted within the fit-together hole before the fitted-together portion and the fit-together portion are fitted-together.

In the structure for joining resin parts of the seventh aspect, the second extending piece has a length that is such that the second extending piece is inserted within the fit-together hole, before the fitted-together portion and the fit-together portion are fit-together. Therefore, this second extending piece can be used as a guide at the time when the fitted-together portion of the one resin part and the fit-together portion of the other resin part are fit-together.

In a bumper cover structure of an eighth aspect of the present invention, the structure for joining two resin parts of any of the first through the seventh aspects is applied thereto, and the bumper cover structure comprises an upper bumper that is the one resin part and a lower bumper that is the other resin part, wherein the lower bumper is provided integrally with the upper bumper beneath the upper bumper.

In the bumper cover structure of the eighth aspect, the lower bumper, that is the other resin part, is provided beneath the upper bumper, that is the one resin part, and integrally with the upper bumper. Due to the second extending piece that is provided at the lower bumper being inserted in the fit-together hole of the engaged portion provided at the upper bumper, the second extending piece abuts the first extending piece that extends-out from the first side wall that structures a portion of the engaged portion. Due thereto, the lower bumper is positioned in a vehicle vertical direction with respect to of the upper bumper.

Advantageous Effects of Invention

As described above, the structure for joining two resin parts of the first aspect of the present invention has the excellent effect that another resin part can be positioned with respect to one resin part, and the occurrence of sink marks of the design surface sides at the both resin parts can be prevented or suppressed.

The structure for joining two resin parts of the second aspect of the present invention has the excellent effect that it is possible to suppress the abutment wall starting to move away from the first side wall.

The structure for joining two resin parts of the third aspect of the present invention has the excellent effect that, due to the fit-together piece being fit-together with the fitted-together portion, movement, along the direction of inserting the fit-together piece into the fit-together hole, of the other resin part with respect to the one resin part is restricted.

The structure for joining two resin parts of the fourth aspect of the present invention has the excellent effect that the assembly workability of the two resin parts improves.

The structure for joining two resin parts of the fifth aspect of the present invention has the excellent effect that, at the time when the fit-together piece is fit-together with the fitted-together portion, the amount of flexing of the second extending piece can be suppressed.

The structure for joining two resin parts of the sixth aspect of the present invention has the excellent effect that the strength of the mold for manufacturing the resin part can be improved, and the lifespan of the mold can be lengthened.

The structure for joining two resin parts of the seventh aspect of the present invention has the excellent effect that the assembly workability of the two resin parts improves.

The bumper cover structure of the eighth aspect of the present invention has the excellent effect that the upper bumper and the lower bumper can be made integral in a state in which the gap between the upper bumper and the lower bumper is maintained constant, and therefore, the design of the bumper cover improves.

BRIEF DESCRIPTION OF THE DRAWINGS

FIG. 5A and FIG. 5B are enlarged sectional views in which main portions of the upper bumper and the lower bumper, that relates to the present embodiment, are viewed from the vehicle transverse direction outer side, where FIG. 5A shows a state before guide pieces are inserted into a fit-together hole and FIG. 5B shows a state in which the guide pieces are inserted in the fit-together hole.

DETAILED DESCRIPTION OF THE INVENTION

A bumper cover structure, to which is applied a structure for joining resin parts relating to an embodiment of the present invention, is described by using the drawings. Note that arrow FR indicates a vehicle longitudinal direction front side, arrow UP indicates a vehicle vertical direction upper side, and arrow W indicates a vehicle transverse direction. When upper, lower, front, rear are used in the following description, they mean the vertical direction and the longitudinal direction of the vehicle unless otherwise stated.

(Structure of Bumper Cover)

Figure 8:
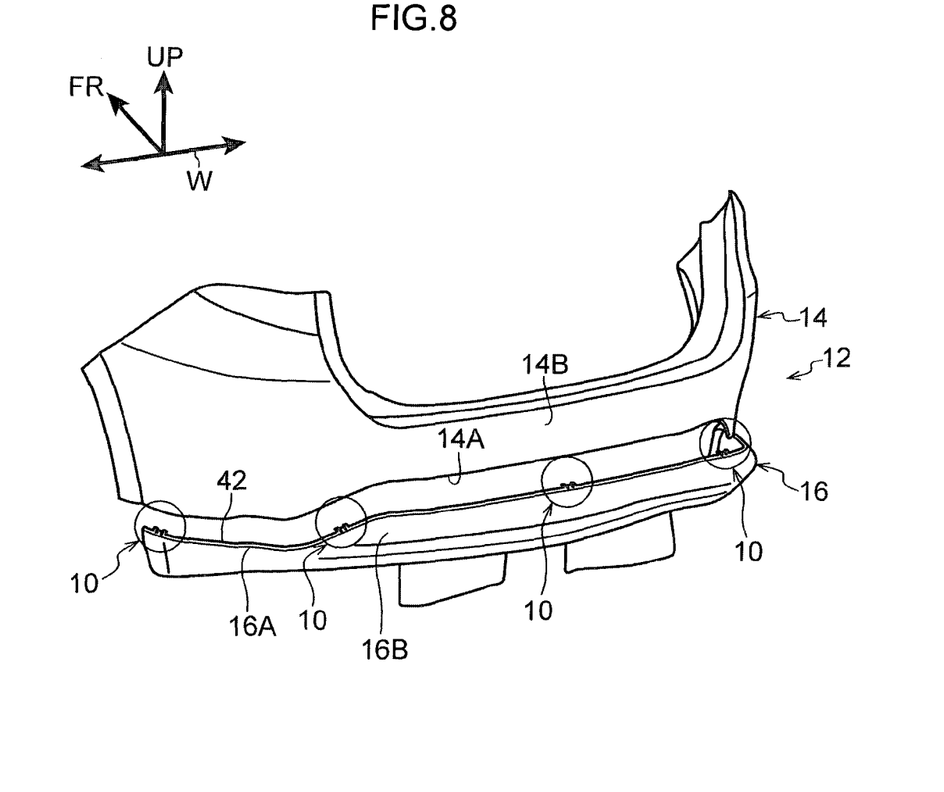
FIG. 8 is an exploded perspective view that is viewed from the vehicle rear side of the upper bumper and the lower bumper that relates to the present embodiment.

A rear bumper cover 12 of a vehicle 11, that structures a bumper cover structure 10 relating to an embodiment of the present invention, is shown in FIG. 8. The rear bumper cover 12 is structured by an upper bumper 14 that serves as one resin part, and a lower bumper 16 that serves as another resin part, and the both are made integral due to the lower bumper 16 being mounted to the upper bumper 14.

Figure 2:
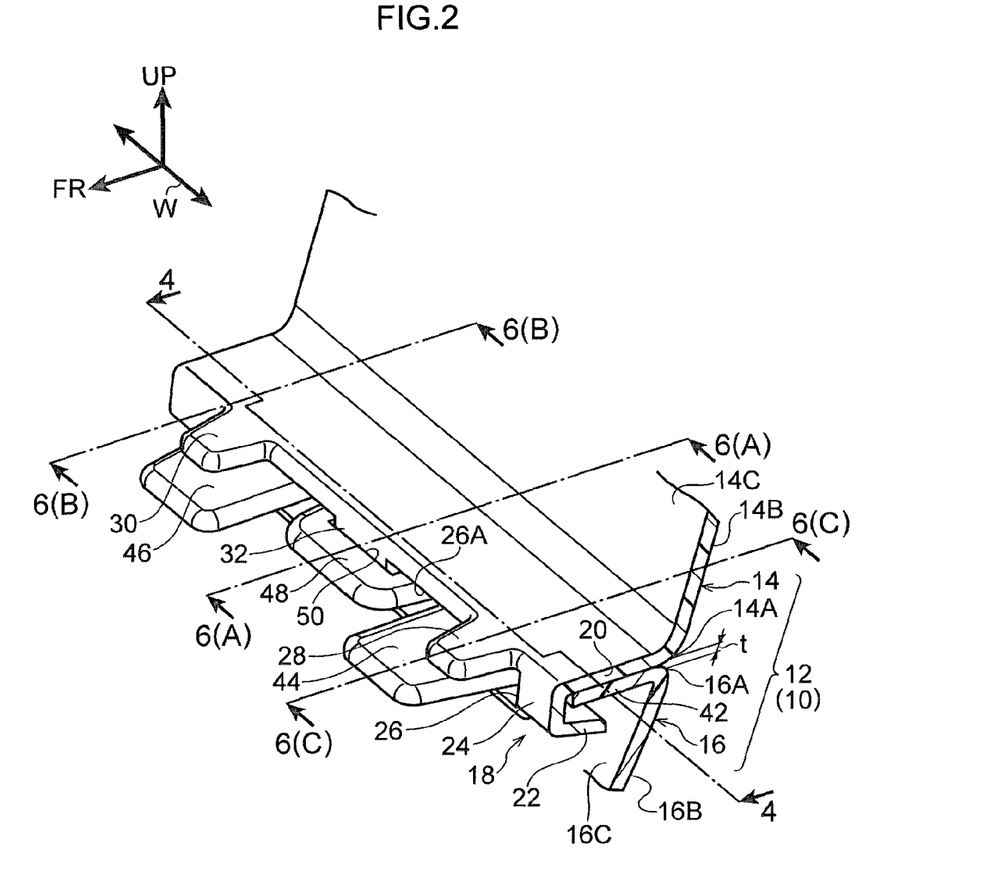
FIG. 2 is an enlarged perspective view in which main portions of the upper bumper and the lower bumper, to which the structure for joining resin parts relating to the present embodiment is applied, are viewed from the vehicle transverse direction outer side and a vehicle longitudinal direction front side.
Figure 5A:
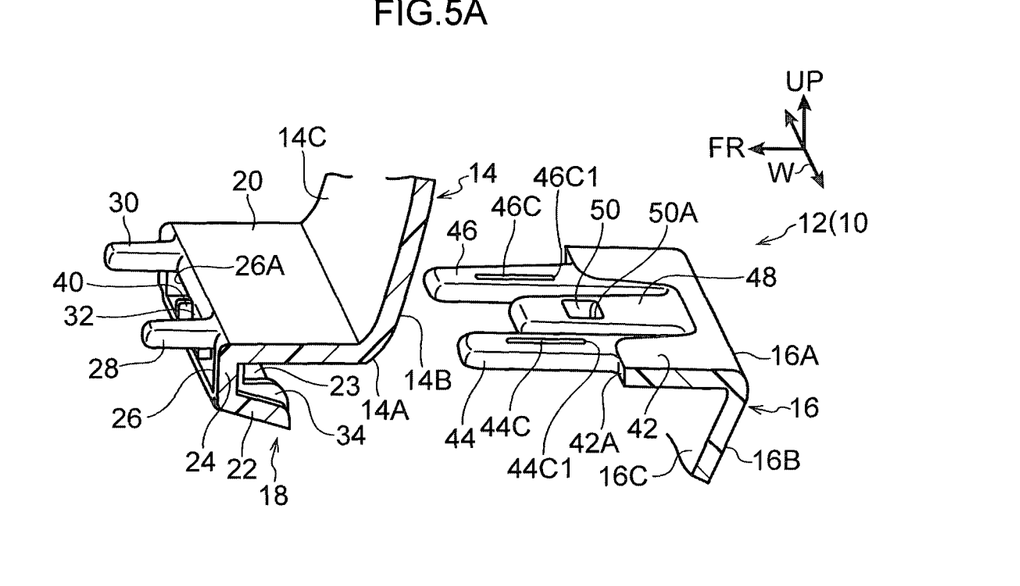

As shown in FIG. 2 and FIG. 5A, an engaged portion 18, that is bent toward the front side (a reverse surface 14C side that is opposite from a design surface 14B of the upper cover 14) and is formed in a hook shape, is provided at a lower end portion 14A of the upper bumper 14. Here, "hook shape" means a shape whose cross-sectional shape is L-shaped or U-shaped or the like. In the present embodiment, the cross-sectional shape, that is cut along the vehicle vertical direction and the vehicle longitudinal direction, of the engaged portion 18 is formed in a substantial U-shape whose rear side is open. The engaged portion 18 is structured to include an upper wall 20 that serves as a first side wall, a lower wall 22 that serves as a second side wall and faces the upper wall 20, and an inner wall 24 that connects the lower wall 22 and the upper wall 20.

Plural fit-together holes 26, that serve as portions that structure the bumper cover structure 10 (see FIG. 8), are formed in the inner wall 24 at the engaged portion 18 along the vehicle transverse direction. Note that description of orientation regarding the fit-together hole 26, that is described by using the vehicle as a reference (the orientation of the vehicle transverse direction or the vehicle longitudinal direction), differs in accordance with the position at which the fit-together hole 26 is provided. Therefore, here, description is given of the fit-together hole 26 that is formed at the vehicle transverse direction central portion of the engaged portion 18.

Figure 1:
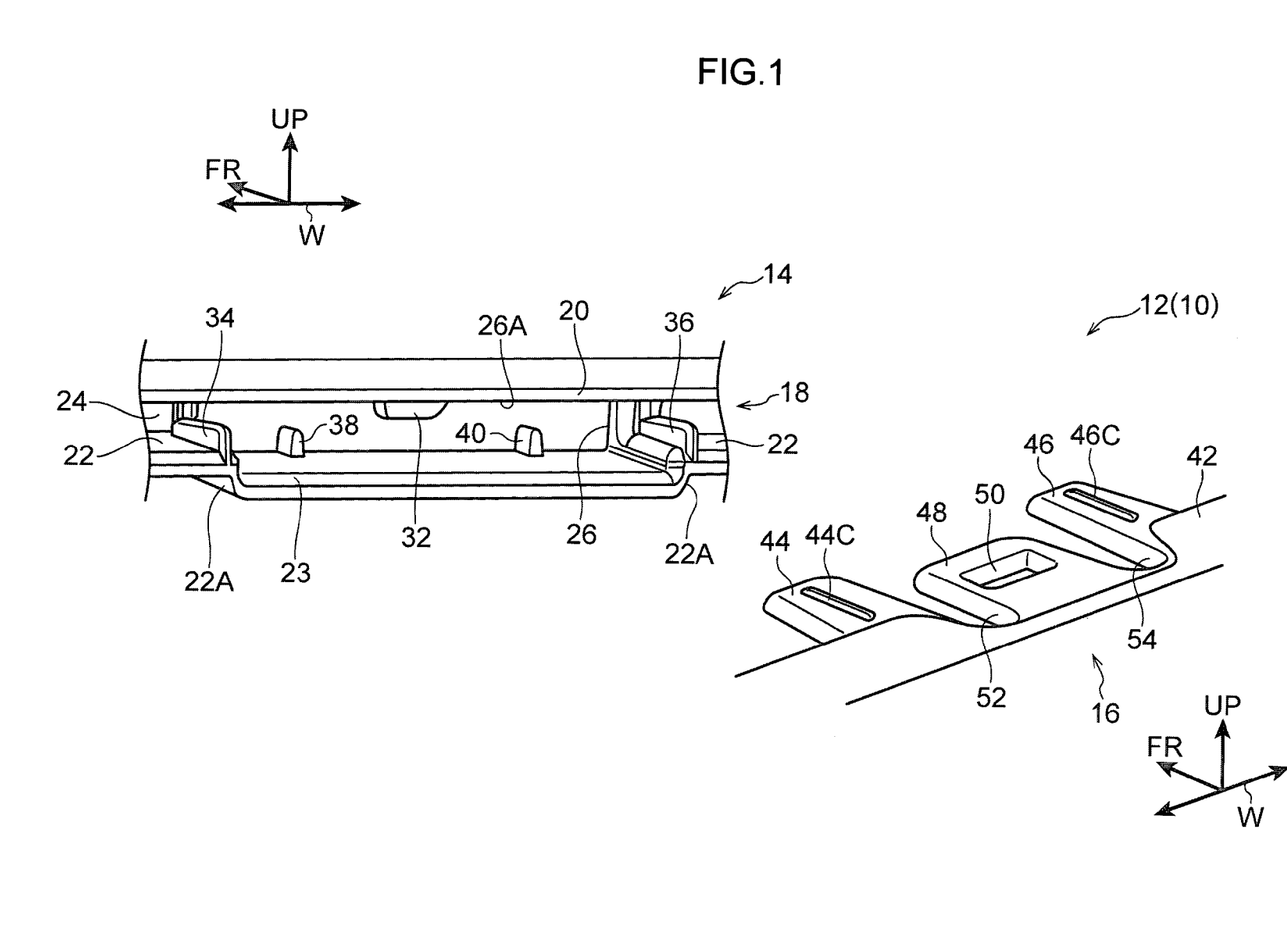
FIG. 1 is an enlarged exploded perspective view in which main portions of an upper bumper and a lower bumper, that configure a structure for joining resin parts relating to the present embodiment, are viewed from a vehicle transverse direction outer side and a vehicle longitudinal direction rear side.

As shown in FIG. 1 and FIG. 2, the fit-together hole 26 is formed in a rectangular shape whose lengthwise direction is along the vehicle transverse direction. Extending pieces 28, 30 that serve as first extending pieces are disposed at an upper edge portion 26A that serves as a peripheral edge portion, and respectively extend out toward the front side from the upper wall 20 of the engaged portion 18 at both end portions in a lengthwise direction of the fit-together hole 26.

Note that, at the places where the fit-together holes 26 are formed, a step portion 22A (see FIG. 1) is provided at the lower wall 22, and a lower wall 23 is provided at a position that is one step downward than the lower wall 22. Namely, the lower wall at the engaged portion 18 is structured to include the lower wall 22 and the lower wall 23.

Figure 3:
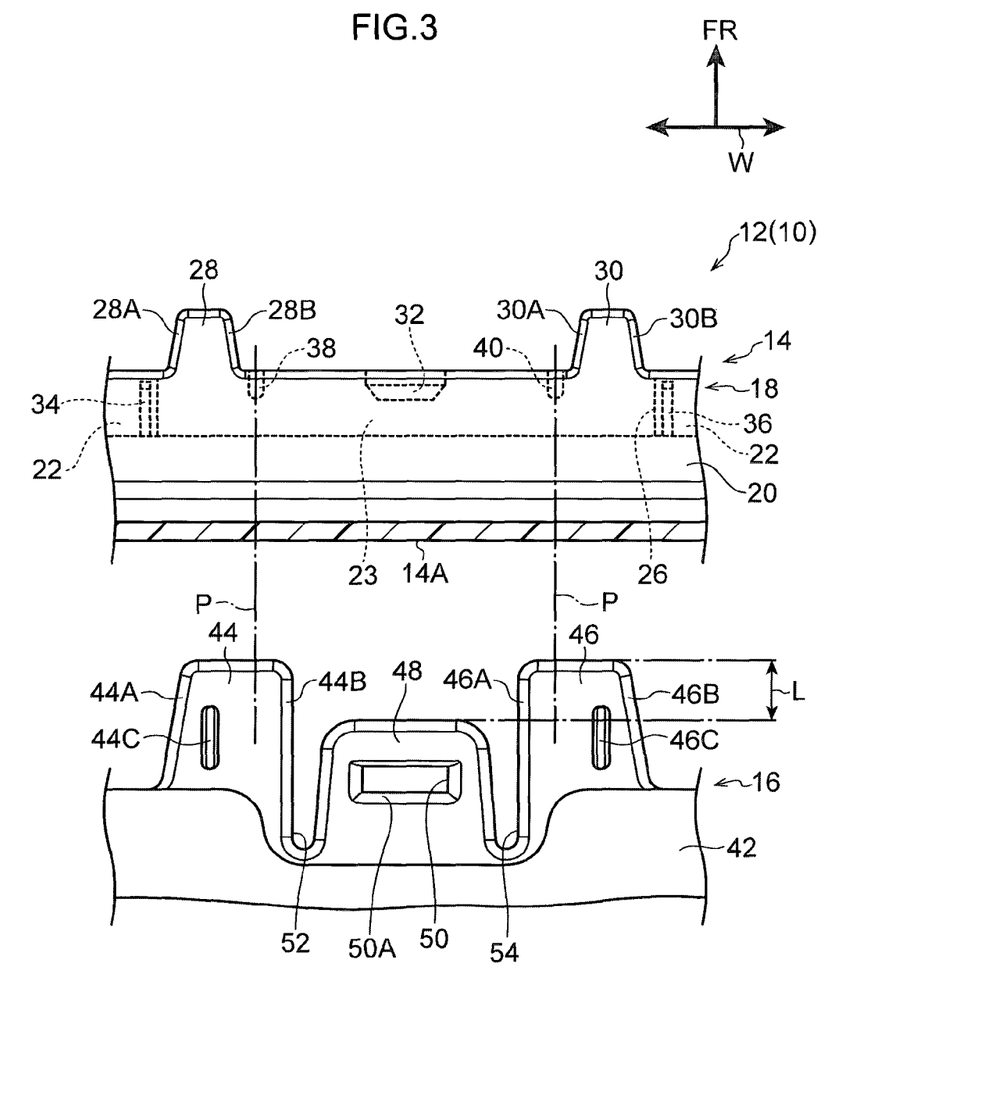
FIG. 3 is an exploded plan view in which main portions of the upper bumper and the lower bumper, that relates to the present embodiment, are enlarged.

The extending pieces 28, 30 are formed in substantially rectangular shapes whose lengthwise direction is along the vehicle longitudinal direction. As shown in FIG. 3, at the extending piece 28, a side wall 28A and a side wall 28B, that are disposed so as to oppose each other, are inclined in directions of approaching one another while heading toward a front side in the vehicle longitudinal direction. Further, at the extending piece 30, a side wall 30A and a side wall 30B, that are disposed so as to oppose each other, are inclined in directions of approaching one another while heading toward the front side.

As shown in FIG. 1, a fit-together claw 32 that serves as a fitted-together portion hangs-down toward the lower side from the upper edge portion 26A of the fit-together hole 26 at a central portion in the lengthwise direction of the fit-together hole 26, between the extending piece 28 and the extending piece 30. Further, abutment ribs 34, 36, that are formed in substantially semicircular shapes as seen in side view, are provided respectively in vicinities of the fit-together hole 26, at the lower wall 22 of the engaged portion 18.

As shown in FIG. 3, opposing ribs 38, 40 are respectively provided at the lower wall 23, at positions that are offset from the extending pieces 28, 30 as seen in plan view. The opposing ribs 38, 40 are provided on lines P that are the loci of movement of guide pieces 44, 46 that are described later.

Figure 4:
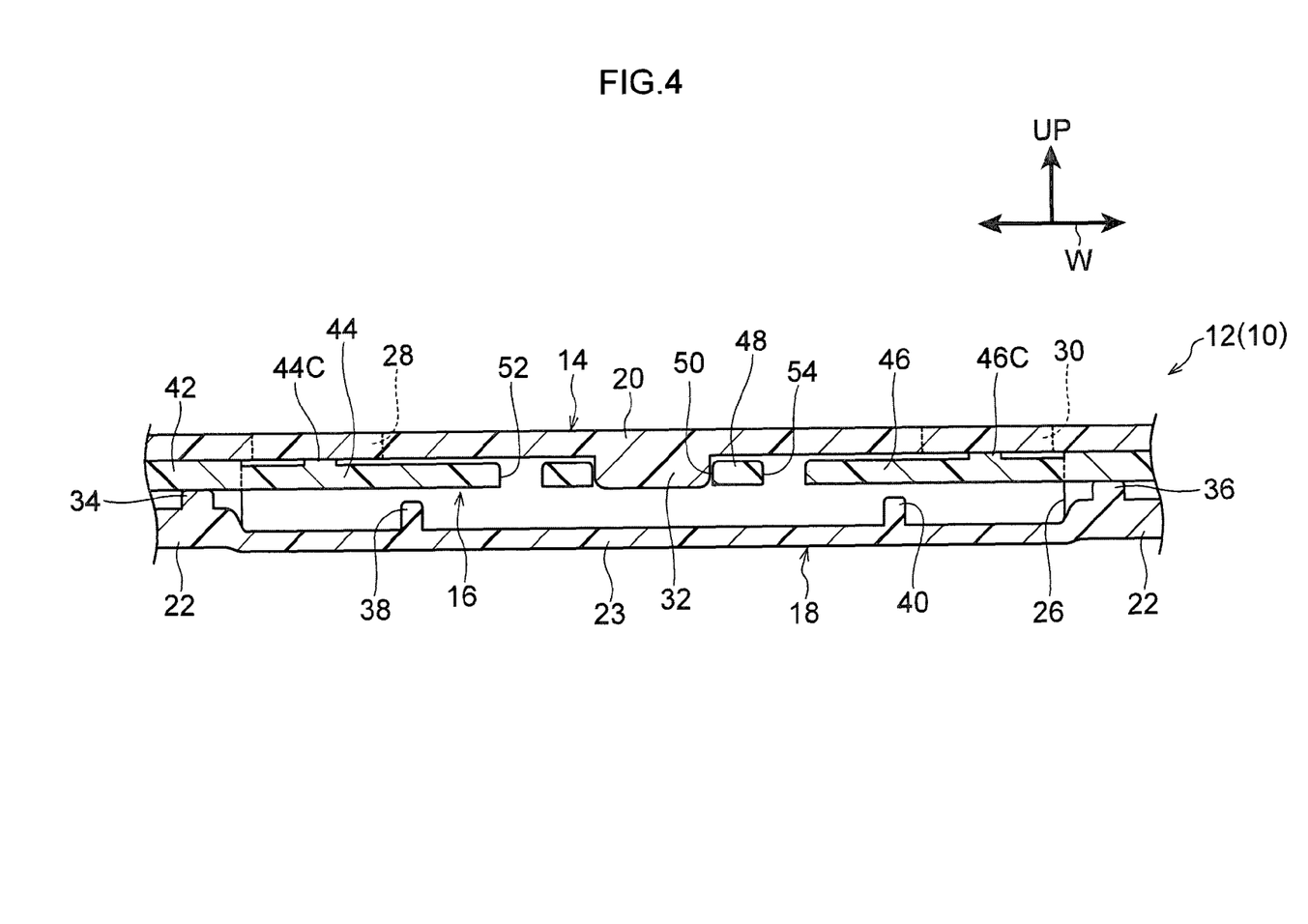
FIG. 4 is a cross-sectional view showing a state cut along line 4-4 of FIG. 2.

Further, as shown in FIG. 4, the heights of the opposing ribs 38, 40 are set so as to be slightly lower than the heights of the abutment ribs 34, 36.

Figure 5B:
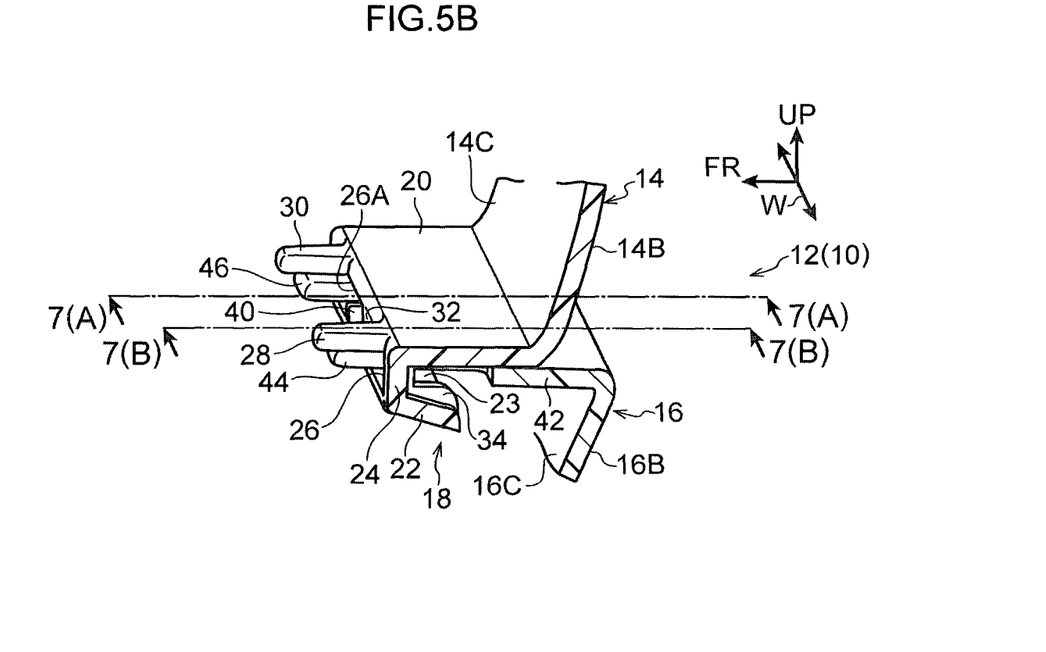
Figure 5C:
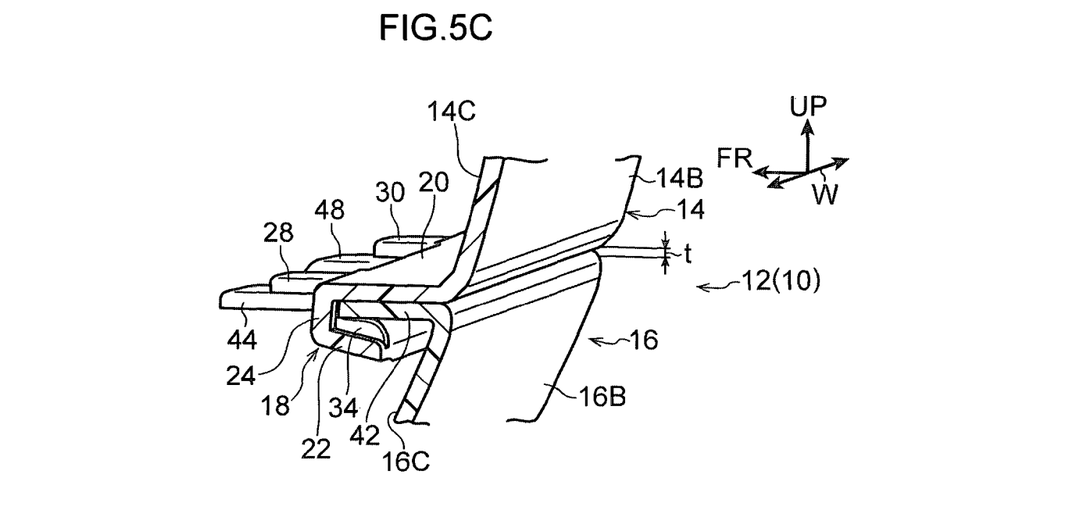
FIG. 5C is an enlarged sectional view in which main portions of the upper bumper and the lower bumper are viewed from the vehicle transverse direction outer side and the vehicle longitudinal direction rear side, and shows a state in which the guide pieces are inserted in the fit-together hole and a fit-together claw is fit-together with a hole portion.

As shown in FIG. 1 and in FIG. 5A, an abutment wall 42, that is bent toward the front side (a reverse surface 16C side that is opposite from a design surface 16B of the lower bumper 16), is provided at an upper end portion 16A of the lower bumper 16, and can abut the upper wall 20 at the engaged portion 18 of the upper bumper 14 (see FIG. 5C). Note that, for easy understanding of the drawings, FIG. 5C is shown in a different direction from that of FIG. 5A and FIG. 5B.

The guide pieces 44, 46, that serve as second extending pieces and that can be inserted into the fit-together hole 26 at the engaged portion 18 of the upper bumper 14, respectively extend from a distal end portion 42A of the abutment wall 42 toward the vehicle longitudinal direction front side. The guide pieces 44, 46 are formed in substantially rectangular shapes whose lengthwise direction is along the vehicle longitudinal direction, and are shaped so as to be disposed at the lengthwise direction both end portions of the fit-together hole 26 when the guide pieces 44, 46 are inserted in the fit-together hole 26.

Figure 6A:
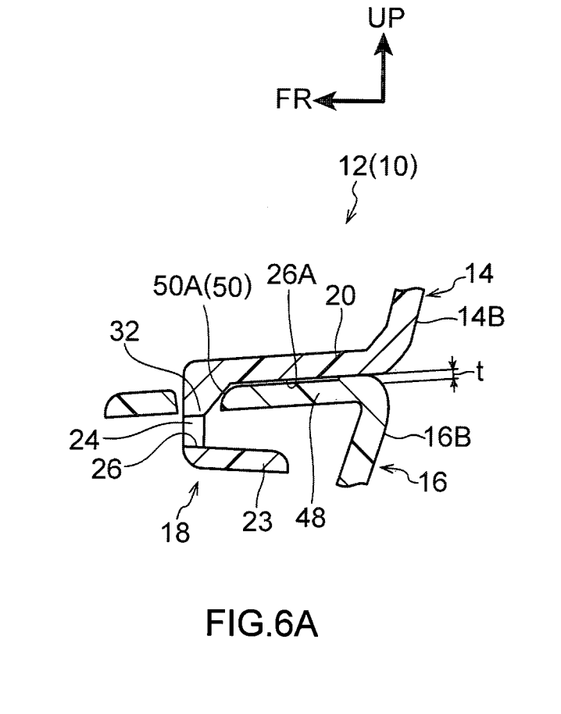
FIG. 6A is a cross-sectional view showing a state cut along line 6(A)-6(A) of FIG. 2.

A fit-together piece 48 is provided so as to extend toward the front side, between the guide piece 44 and the guide piece 46. The fit-together piece 48 is formed in a substantially rectangular shape whose lengthwise direction is along the vehicle transverse direction. A hole portion 50, that serves as a fit-together portion with which the fit-together claw 32 fits-together, is provided in the central portion of the fit-together piece 48. As shown in FIG. 6A, the corners of an upper edge portion 50A, that is at the rear portion and upper portion of the hole portion 50, are rounded, and the fit-together claw 32 of the upper bumper can fit-together with this hole portion 50 in the state in which the fit-together piece 48 is inserted in the fit-together hole 26.

As shown in FIG. 3, side walls 44B, 46A, that are positioned at the fit-together piece 48 sides, are respectively formed along the vehicle longitudinal direction at the guide pieces 44, 46. A cut-out portion 52 that is substantially U-shaped in plan view is provided between the side wall 44B of the guide piece 44 and the fit-together piece 48. Further, a cut-out portion 54 that is substantially U-shaped in plan view is provided also between the fit-together piece 48 and the side wall 46A of the guide piece 46. Side walls 44A, 46B of the guide pieces 44, 46 that are positioned at the sides opposite the fit-together piece 48, are inclined toward the fit-together piece 48 sides while heading toward the front side.

Further, as shown in FIG. 5A, the top surfaces of the guide pieces 44, 46 and the fit-together piece 48 are formed to be one step lower than the top surface of the abutment wall 42. Adjustment ribs 44C, 46C are respectively provided at the top surfaces of the guide pieces 44, 46 along the direction in which the guide pieces 44, 46 extend.

Figure 6B:
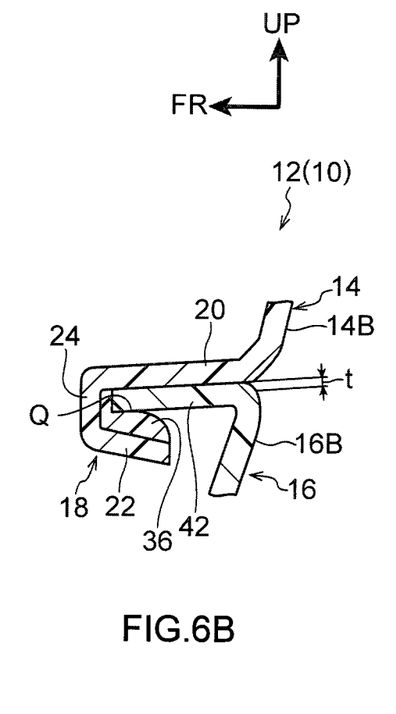
FIG. 6B is a cross-sectional view showing a state cut along line 6(B)-6(B) of FIG. 2.
Figure 6C:
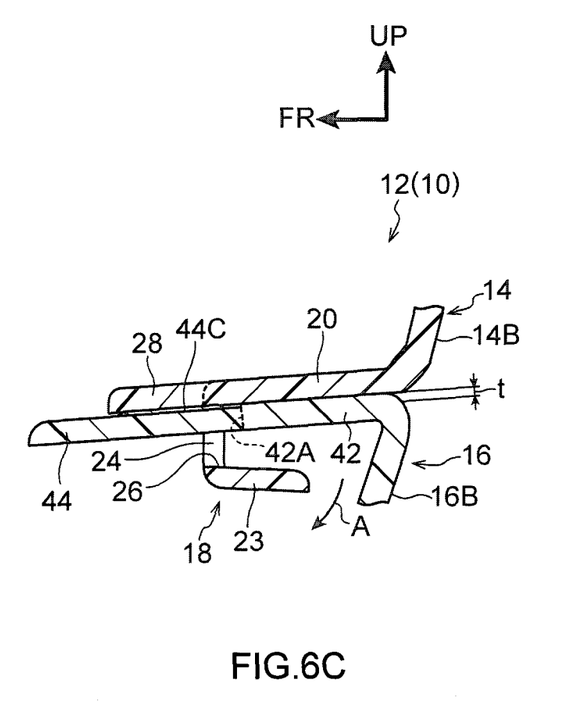
FIG. 6C is a cross-sectional view showing a state cut along line 6(C)-6(C) of FIG. 2.

As shown in FIG. 4 and FIG. 6C, in the state in which the guide pieces 44, 46 are inserted in the fit-together hole 26 of the upper bumper 14 (note that only the guide piece 44 side is shown in FIG. 6C), these adjustment ribs 44C, 46C can abut the extending pieces 28, 30, respectively. Further, as shown in FIG. 3, the lengths of the guide pieces 44, 46 are formed to be longer, by length L, than the length of the fit-together piece 48, and are designed such that the guide pieces 44, 46 can be inserted in the fit-together hole 26 before the fit-together claw 32 fits-together with the hole portion 50 (see FIG. 7A).

(Operation/Effects of Bumper Cover)

As shown in FIG. 5A, in the present embodiment, the fit-together hole 26 is provided in the inner wall 24 at the engaged portion 18 provided at the upper bumper 14, and the extending pieces 28, 30 respectively extend toward the front side from the upper wall 20 of the engaged portion 18 that is positioned at the upper edge portion 26A of the fit-together hole 26. On the other hand, the abutment wall 42 is provided at the lower bumper 16, and can abut the upper wall 20 of the engaged portion 18 at the upper bumper 14. The guide pieces 44, 46, that can be inserted into the fit-together hole 26 of the upper bumper 14, respectively extend toward the front side from the distal end portion 42A of the abutment wall 42.

Due to such a structure, in the present embodiment, when the guide pieces 44, 46 of the lower bumper 16 are inserted in the fit-together hole 26 of the upper bumper 14 as shown in FIG. 6C, the abutment wall 42 of the lower bumper 16 abuts the upper wall 20 of the upper bumper 14. Due thereto, a gap t is formed between the upper wall 20 of the upper bumper 14 and the abutment wall 42 of the lower bumper 16, and this gap t can be seen from the design surface 14B, 16B sides.

The adjustment ribs 44C, 46C are provided at the guide pieces 44, 46. In the state in which these guide pieces 44, 46 are inserted in the fit-together hole 26 and the abutment wall 42 of the lower bumper 16 abuts the upper wall 20 of the upper bumper 14, the adjustment ribs 44C, 46C are made to abut the extending pieces 28, 30 respectively.

Due thereto, even if the abutment wall 42 starts to move away from the upper wall 20 (even if the abutment wall 42 starts to rotate in the direction of arrow A) due to its own weight or the like with the distal end portion 42A of the abutment wall 42 being the origin, the adjustment ribs 44C, 46C of the guide pieces 44, 46, that extend from the distal end portion 42A of the abutment wall 42, are abutting the extending pieces 28, 30, and therefore, as a result, the abutment wall 42 moving away from the upper wall 20 due to its own weight is suppressed. Namely, so-called sagging due to its own weight can be suppressed.

Accordingly, the state in which the abutment wall 42 of the lower bumper 16 abuts the upper wall 20 of the upper bumper 14 can be maintained, and this gap t can be maintained at a predetermined dimension. In this way, in accordance with the present embodiment, the gap t between the upper bumper 14 and the lower bumper 16 can be maintained constant, and therefore, the design of the bumper cover is improved.

Further, as shown in FIG. 5A, the engaged portion 18 of the upper bumper 14 is formed by being bent toward the front side from the design surface 14B at the lower end portion 14A in the vehicle vertical direction of the upper bumper 14. On the other hand, the abutment wall 42 of the lower bumper 16 is formed by being bent toward the front side from the design surface 16B at the upper end portion 16A of the lower bumper 16. Therefore, the upper wall 20 of the engaged portion 18 and the abutment wall 42 can be formed without changing the thickness at the upper bumper 14 and the lower bumper 16.

Accordingly, at the upper bumper 14 and the lower bumper 16, sink marks that arise at the design surface 14B, 16B sides can be prevented or suppressed. Namely, in accordance with the present embodiment, the lower bumper 16 is positioned with respect to the upper bumper 14, and the occurrence of sink marks of the design surface 14B, 16B sides at the upper bumper 14 and the lower bumper 16 can be prevented or suppressed.

Here, in the present embodiment, the adjustment ribs 44C, 46C are provided at the guide pieces 44, 46, and these adjustment ribs 44C, 46C are made to abut the extending pieces 28, 30, respectively. Due thereto, the adjustment ribs 44C, 46C can be made to at least linearly contact the extending pieces 28, 30. In a case in which the guide pieces 44, 46 are made to directly abut the extending pieces 28, 30 respectively, high accuracy is required of the guide pieces 44, 46 when attempting to ensure surfaces over the entire guide pieces 44 46 can abut the extending pieces 28, 30. However, by providing the adjustment ribs 44C, 46C at the guide pieces 44, 46 and making the guide pieces 44, 46 indirectly abut the extending pieces 28, 30 via these adjustment ribs 44C, 46C, it suffices to not require high precision of the guide pieces 44, 46.

Further, in the present embodiment, as shown in FIG. 4, the abutment ribs 34, 36 are provided at the lower wall 22 of the engaged portion 18 of the upper bumper 14. As shown in FIG. 6B, the abutment ribs 34, 36 are set so as to abut the abutment wall 42 in the state in which the abutment wall 42 of the lower bumper 16 abuts the upper wall 20 of the upper bumper 14 (note that the abutment rib 36 side is shown in FIG. 6B). Due to these abutment ribs 34, 36, the abutment wall 42 is supported, and the state in which the abutment wall 42 is made to abut the upper wall 20 is maintained, and the abutment wall 42 starting to move away from the upper wall 20 can be suppressed.

Further, as described above, due to the abutment ribs 34, 36 being made to abut the abutment wall 42 and the adjustment ribs 44C, 46C being made to abut the extending pieces 28, 30 respectively, so-called sagging due to its own weight of the lower bumper 16, with places Q as the starting points where the abutment wall 42 linearly contacts the abutment ribs 34, 36, is not caused. Accordingly, the state in which the abutment wall 42 of the lower bumper 16 abuts the upper wall 20 of the upper bumper 14 is maintained.

Further, in the present embodiment, as shown in FIG. 4, the opposing ribs 38, 40 that oppose the guide pieces 44, 46 are respectively provided at the lower wall 23 of the engaged portion 18 formed at the upper bumper 14, in a state in which there are gaps between the opposing ribs 38, 40 and the guide pieces 44, 46 that are inserted in the fit-together hole 26.

Figure 7A:
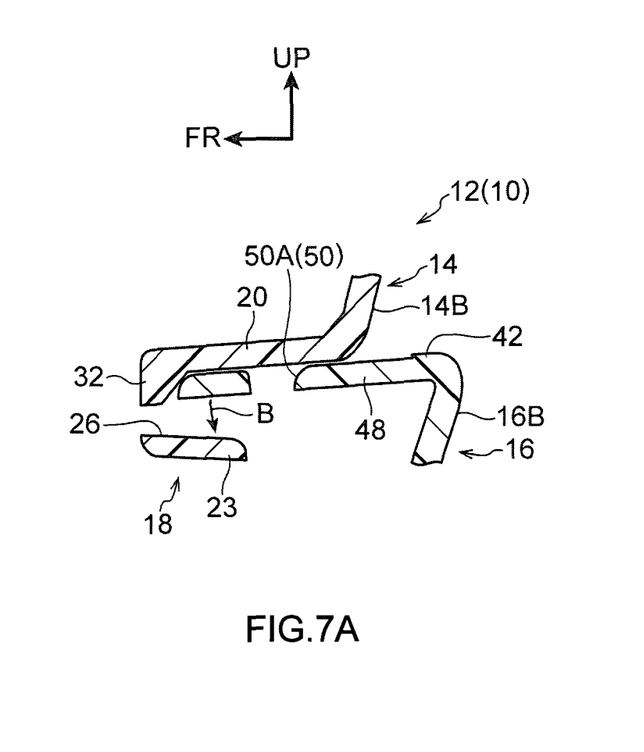
FIG. 7A is a cross-sectional view showing a state cut along line 7(A)-7(A) of FIG. 5.
Figure 7B:
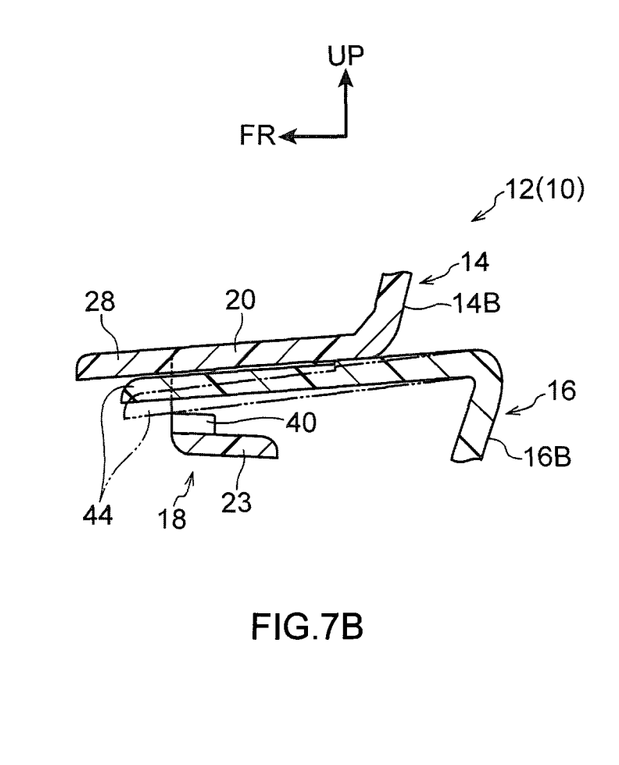
FIG. 7B is a cross-sectional view showing a state cut along line 7(B)-7(B) of FIG. 5.

As shown in FIG. 7A, at the time when the fit-together piece 48 fits-together with the fit-together claw 32, due to flexural deformation of this fit-together piece 48 (deformation in the arrow B direction), as shown in FIG. 7B, the opposing ribs 38, 40 can abut the guide pieces 44, 46 in a case in which the guide pieces 44, 46 flex (shown by the imaginary lines) following the aforementioned deformation of the fit-together piece 48 (note that the guide piece 44 and opposing rib 40 side is shown in FIG. 7B). Namely, the amount of flexing of the guide pieces 44, 46 is suppressed by the opposing ribs 38, 40. Note that, as shown in FIG. 3, the cut-out portions 52, 54 are provided between the guide piece 44 and the fit-together piece 48 as well as between the fit-together piece 48 and the guide piece 46, respectively, and the fit-together piece 48 is made to flex easily.

Further, the opposing ribs 38, 40 are disposed at positions that are offset from the extending pieces 28, 30 as seen in plan view. Therefore, at a core mold (not illustrated) for forming the upper bumper 14, in a case in which the extending pieces 28, 30 and the opposing ribs 38, 40 are formed at positions that face one another, a thickness becomes thin at the portions of the core mold that correspond to the extending pieces 28, 30 and the opposing ribs 38, 40. However, in the present embodiment, because the extending pieces 28, 30 and the opposing ribs 38, 40 are offset in plan view, the thickness of the core mold can be made to be thick. Accordingly, the strength of the mold can be improved, and the lifespan of the mold can be lengthened.

Note that, in the present embodiment, as shown in FIG. 4, at the place where the fit-together hole 26 is formed, the step portion 22A is provided at the lower wall 22 at the engaged portion 18, and the lower wall 23 is provided at a position that is one step downward in the vehicle vertical direction than this lower wall 22. Due thereto, at the place where the fit-together hole 26 is provided, as compared with a case in which the lower wall is formed flush with the lower wall 22, the thickness of a projecting portion of the core mold can be made to be thick at the core mold for forming the fit-together hole 26.

Generally, in order to form the depth direction of the fit-together hole 26, a projecting portion is formed at the core mold. When taking the lifespan of the mold into consideration, it is preferable that the relationship between the thickness and the height of this projecting portion be less than around 1:3.

As shown in FIG. 2, in the present embodiment, at the upper bumper 14, the fit-together claw 32 is provided at the upper edge portion 26A of the fit-together hole 26. Further, at the lower bumper 16, the fit-together piece 48 extends-out from the distal end portion of the abutment wall 42. The hole portion 50, with which the fit-together claw 32 is fit together, is provided in the fit-together piece 48. In the state in which the fit-together piece 48 is inserted in the fit-together hole 26, the fit-together claw 32 fits-together with the hole portion 50.

Due thereto, movement along the vehicle longitudinal direction (movement along the direction of inserting the fit-together piece 48 into the fit-together hole 26) of the lower bumper 16 with respect to the upper bumper 14 is restricted. Namely, merely by moving the fit-together piece 48 of the lower bumper 16 in the direction of being inserted into the fit-together hole 26 of the upper bumper 14, the fit-together claw 32 fits-together with the hole portion 50 formed in the fit-together piece 48, and therefore, the assembly workability is good.

For example, although not illustrated, in a case in which a fit-together claw is provided at the fit-together piece 48, when the fit-together piece 48 is inserted into the fit-together hole 26, the fit-together piece 48 must be inserted in with caution so that this fit-together claw does not contact the design surface 14B of the upper bumper 14. However, in the present embodiment, there is no such need. Note that because the corners of the upper edge portion 50A (see FIG. 6A) of the vehicle longitudinal direction rear portion and vehicle vertical direction upper portion of the hole portion 50 are rounded, the area over which the fit-together claw 32 can catch on the hole portion 50 can be increased.

Further, in the present embodiment, as shown in FIG. 3, the length of the guide pieces 44, 46 is formed to be longer, by the length L, than the fit-together piece 48, and the guide pieces 44, 46 are set such that the guide pieces 44, 46 are inserted in the through-hole 26 (see FIG. 7B) before the fit-together claw 32 is fit-together with the hole portion 50 (see FIG. 7A). Due thereto, these guide pieces 44, 46 can be utilized as guides at the time of fitting the fit-together piece 48 together with the fit-together hole 26, and the assembly workability improves.

Further, at the guide pieces 44, 46, the side walls 44A, 46B, that are positioned at the sides opposite the engaging piece 48, are respectively inclined toward the fit-together piece 48 side while heading toward the front side. Therefore, at the time when the guide pieces 44, 46 are inserted into the fit-together hole 26, these guide pieces 44, 46 are easily inserted without interfering with the inner edge portion of the fit-together hole 26. Due thereto, the assembly workability can be improved.

As shown in FIG. 5A, the adjustment ribs 44C, 46C are formed at the guide pieces 44, 46, respectively, and the guide pieces 44, 46 are structures that extend-out from the distal end portion of the abutment wall 42 that extends-out toward the vehicle front side from the vehicle vertical direction upper end portion 16A of the lower bumper 16. Namely, end portions 44C1, 46C1 of the adjustment ribs 44C, 46C are not connected to the reverse surface 16C of the lower bumper 16, and are formed at places that do not affect the design surface 16B of the lower bumper 16.

Therefore, for example, although not illustrated, in a case that a rib is formed but effects on the design surface needs to be considered, electrical discharge machining may be selected in order to form the end portion of the rib to be narrow so as not to affect the design surface. Such a machining does not have to be used in the manufacturing of the mold in the present embodiment. Accordingly, at the lower bumper 16 of the present embodiment, the mold can be directly milled by a cutter, and the cost of manufacturing the mold can be reduced as compared with a case in which electrical discharge machining is carried out.

Other Embodiments

In the present embodiment, as shown in FIG. 1, at the upper bumper 14, the fit-together claw 32 is provided at the upper edge portion 26A of the fit-together hole 26, and, at the lower bumper 16, the hole portion 50 is provided in the fit-together piece 48 that extends-out from the distal end portion of the abutment wall 42, and the fit-together claw 32 is fit-together with this hole portion 50. However, it suffices to be able to restrict movement, in the vehicle longitudinal direction and the vehicle transverse direction, of the lower bumper 16 with respect to the upper bumper 14, and therefore, the present invention is not limited to the same.

Figure 9:
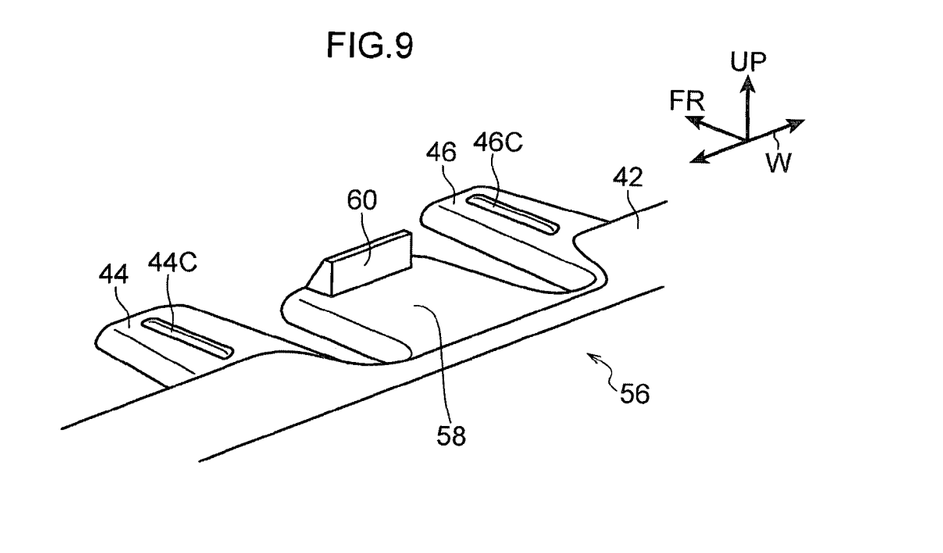
FIG. 9 is a perspective view that corresponds to FIG. 1 and shows a modified example of the lower bumper that relates to the present embodiment.

For example, as shown in FIG. 9, a claw portion 60 serving as the fit-together portion may be provided at a fit-together piece 58 of a lower bumper 56, and, although not illustrated, a groove portion or the like, that serves as a fitted-together portion with which this claw portion 60 is fit-together, may be formed at the upper edge portion 26A of the fit-together hole 26 of the upper bumper 14 shown in FIG. 1.

In the present embodiment, as shown in FIG. 2 and FIG. 5A, the fit-together hole 26, the extending pieces 28, 30 and the fit-together claw 32 are provided at the upper bumper 14, and the guide pieces 44, 46 and the fit-together piece 48 are provided at the lower bumper 16. Further, within the fit-together hole 26, the fit-together piece 48 (the hole portion 50) and the fit-together claw 32 are made to fit-together, and the guide pieces 44, 46 (the adjustment ribs 44C, 46C) are made to abut the extending pieces 28, 30.

Namely, within the fit-together hole 26 at the upper bumper 14, movement of the lower bumper 16 in the vehicle longitudinal direction, the vehicle transverse direction and toward the vehicle vertical direction lower side, with respect to the upper bumper 14, are restricted. However, the present invention is not limited to the same. For example, the restricting of movement in the vehicle longitudinal direction and vehicle transverse direction may be carried out at a place other than the fit-together hole 26 at the upper bumper 14.

Figure 10:
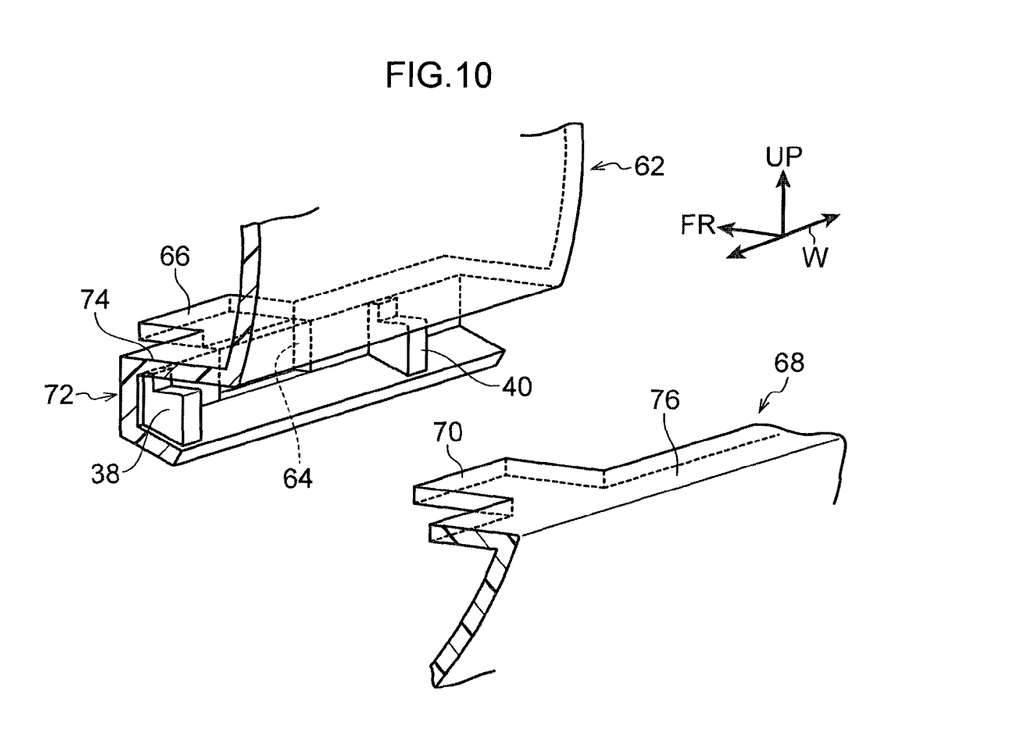
FIG. 10 is an exploded perspective view that corresponds to FIG. 1 and shows a modified example of the upper bumper and the lower bumper that relates to the present embodiment.

In this case, it suffices for movement of the lower bumper 16 toward the vehicle vertical direction lower side, with respect to the upper bumper 14, to be able to be restricted within the fit-together hole 26 of the upper bumper 14. For example, as shown in FIG. 10, a fit-together hole 64 and an extending piece 66 that serves as a first extending piece are provided at an upper bumper 62, and a guide piece 70 serving as a second extending piece is provided at a lower bumper 68. Further, the guide piece 70 is abutted the extending piece 66 in a state in which an abutment wall 76 of the lower bumper 68 is abutted an upper wall 74, that serves as a first side wall, at a fitted-together portion 72 of the upper bumper 62.

Moreover, the present embodiment describes an example in which the abutment ribs 34, 36 that abut the abutment wall 42 are provided as shown in FIG. 4 (the abutment wall 76 are similarly held (see FIG. 10)). But the abutment ribs 34, 36 are not absolutely necessary. Further, in the present embodiment, the adjustment ribs 44C, 46C are provided at the guide pieces 44, 46, but the adjustment ribs 44C, 46C are not absolutely necessary, and the guide pieces 44, 46 may be made to directly abut the extending pieces 28, 30.

In the above-described embodiment, description is given of the bumper cover at the rear side, but the same holds also for the bumper cover at the front side. Further, because it suffices for the present invention to be a structure for joining resin parts, the present invention is not limited to a bumper cover structure. For example, although not illustrated, the present invention may be applied to a structure for joining a front grill and a molding portion, or a structure for joining an upper panel and a lower panel at an instrument panel, or the like.

Figure 11:
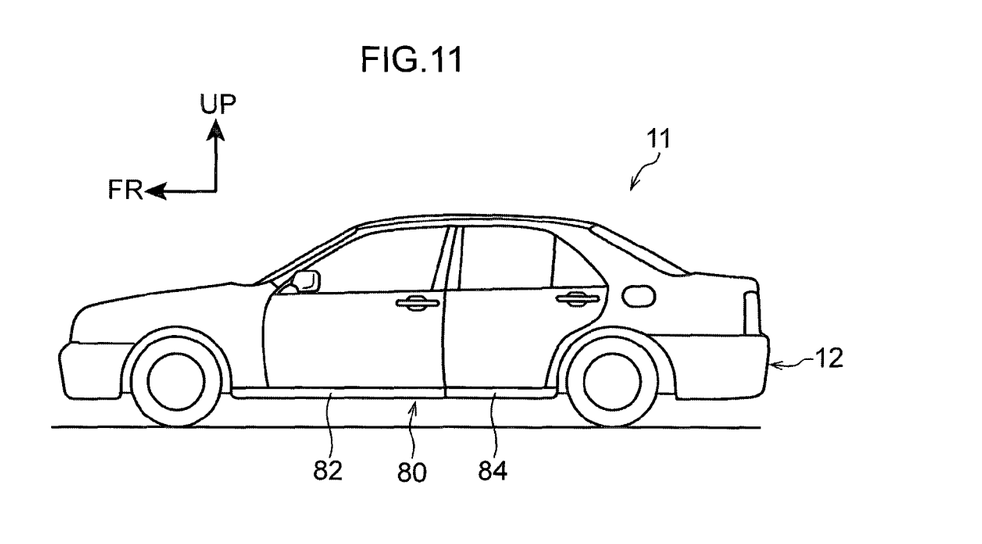
FIG. 11 is a vehicle side view showing a modified example of the structure for joining resin parts relating to the present embodiment.

Further, although these embodiments are structures for joining together resin parts that are disposed along the vehicle vertical direction, they may, of course, be structures for joining together resin parts that are disposed along the vehicle transverse direction or the vehicle longitudinal direction. For example, as shown in FIG. 11, these embodiments may be applied to a front rocker molding 82 that serves as one resin part at a rocker molding 80, and a rear rocker molding 84 that serves as another resin part.

Although an embodiment of the present invention has been described above, the present invention is not limited to the above, and, other than the above, can of course be implemented by being modified in various ways within a scope that does not deviate from the gist thereof.

The disclosures of Japanese Patent Application No. 2013-020727, filed Feb. 5, 2013 are incorporated herein by reference in their entirety.

All publications, patent applications, and technical standards mentioned in this specification are herein incorporated by reference to the same extent as if each individual publication, patent application, or technical standard was specifically and individually indicated to be incorporated by reference.

The invention claimed is:
1. A structure for joining two resin parts, comprising:
one resin part having an engaged portion at an end portion of the one resin part, the engaged portion being bent and formed in a hook shape,
wherein the engaged portion comprises:
an inner wall,
a first side wall that connects the inner wall and the end portion of the one resin part,
a fit-together hole provided at the inner wall; and a first extending piece that is disposed at a peripheral edge portion of the fit-together hole and extends out from the first side wall; and another resin part, that is to be made integral with the one resin part, the other resin part comprising:

an abutment wall that is bent at an end portion of the other resin part; and a second extending piece that extends-out from a distal end portion of the abutment wall, wherein:

the abutment wall abuts the first side wall of the engaged portion, and the second extending piece abuts the first extending piece in a state in which the second extending piece has been inserted in the fit-together hole of the engaged portion and the abutment wall is abutted the first side wall, the first extending piece extends out toward an opposite side from the abutment wall of the other resin part, with the inner wall of the one resin part being interposed between the first extending piece and the abutment wall, in a state in which the other resin part is made integral with the one resin part, the engaged portion further comprises a fitted-together portion that is provided at a peripheral edge portion of the fit-together hole, and the other resin part further comprises a fit-together piece that extends-out from the distal end portion of the abutment wall, and is inserted into the fit-together hole of the engaged portion, and is provided with a fit-together portion that fits-together with the fitted-together portion.

2. The structure for joining two resin parts of claim 1, wherein the engaged portion further comprises a second side wall that is disposed so as to face the first side wall, and an abutment rib that is formed at the second side wall and that abuts the abutment wall of the other resin part in a state in which the abutment wall abuts the first side wall.

3. The structure for joining two resin parts of claim 1, wherein the fitted-together portion is a fit-together claw, and the fit-together portion is a hole portion with which the fit-together claw fits-together.

4. The structure for joining two resin parts of claim 1, wherein an opposing rib is provided at the second side wall of the engaged portion at a position that opposes the second extending piece of the abutment wall that is inserted in the fit-together hole.

5. The structure for joining two resin parts of claim 4, wherein the opposing rib is disposed at a position that is offset with respect to the first extending rib, when viewing the engaged portion in plan view.

6. The structure for joining two resin parts of claim 1, wherein a length of the second extending piece is determined such that the second extending piece is inserted within the fit-together hole before the fitted-together portion and the fit-together portion are fitted-together.

7. A bumper cover structure to which the structure for joining two resin parts of claim 1 is applied, comprising:

an upper bumper that is the one resin part; and a lower bumper that is the other resin part and that is provided integrally with the upper bumper beneath the upper bumper.

* * * * *